United States Patent [19]

Jirousek et al.

[11] 4,391,351

[45] Jul. 5, 1983

[54] PARKING DISC BRAKE ACTUATOR

[75] Inventors: Norman F. Jirousek, Garfield Heights; William M. Shipitalo, Novelty, both of Ohio

[73] Assignee: Towmotor Corporation, Mentor, Ohio

[21] Appl. No.: 273,885

[22] PCT Filed: Dec. 12, 1980

[86] PCT No.: PCT/US80/01673

§ 371 Date: Dec. 12, 1980

§ 102(e) Date: Dec. 12, 1980

[87] PCT Pub. No.: WO82/02077

PCT Pub. Date: Jun. 24, 1982

[51] Int. Cl.$^3$ .............................................. B60T 1/06
[52] U.S. Cl. ................................... 188/18 A; 74/391;
74/467; 74/607; 74/781 R; 180/88; 188/72.7;
188/264 B; 192/93 A; 192/113 B
[58] Field of Search ................ 188/18 A, 18 R, 71.5,
188/71.6, 72.7, 106 F, 264 B, 264 E, 72.1;
180/DIG. 1, 10, 75, 88; 74/467, 607, 750 R, 781
R, 782, 785, 391; 192/93 A, 113 B

[56] References Cited

U.S. PATENT DOCUMENTS

| | | | |
|---|---|---|---|
| 1,316,057 | 9/1919 | Parker | 74/391 |
| 3,048,241 | 8/1962 | Kelley et al. | 188/72 |
| 3,638,763 | 2/1972 | Laverdant | 188/72.6 |
| 3,674,118 | 7/1972 | Klano | 188/72.2 |
| 3,701,400 | 10/1972 | Burnett et al. | 188/72.6 |
| 4,100,986 | 7/1978 | Shipitalo | 180/75 |
| 4,100,988 | 7/1978 | Hildebrecht | 180/75 |
| 4,317,498 | 3/1982 | Jirousek et al. | 74/391 X |

FOREIGN PATENT DOCUMENTS 663402 8/1938 Fed. Rep. of Germany .... 188/18 R

Primary Examiner—George E. A. Halvosa
Attorney, Agent, or Firm—Alan J. Hickman

[57] ABSTRACT

Disc brakes have heretofore not received wide utilization on fork lift trucks because of the problems of space and lubrication. A lift truck has a very small, central hub area which greatly limits the size and type of brake and the ways of lubricating the brake. The disc brake actuator (7) of the present invention meets the problem of incorporating disc brakes (10) into the limited space of the wheel drive assembly (22) of a fork lift truck by mechanically applying the disc brakes (10) through axial rotation of the actuator (37,50) about the jack shafts (18). The difficulty of lubricating the disc brakes (10) is overcome either by utilizing the brake actuator (37) as a conduit for lube oil from the differential (11) or sealing off the lube oil from the differential (11) with a seal (58) in the brake actuator (50) so that the disc brakes (10) can be independently lubricated.

7 Claims, 3 Drawing Figures

PARKING DISC BRAKE ACTUATOR

TECHNICAL FIELD

This invention relates generally to vehicle power trains and, more particularly, to means for actuating a brake and supporting a differential employed thereon.

BACKGROUND ART

One subassembly of the power train of a fork lift truck includes a differential, two jack shafts a wheel drive assembly on each jack shaft, and means for supporting these components with respect to the frame of the lift truck. This power train subassembly also includes a braking system for each wheel which employs either shoe brakes or disc brakes.

Disc brakes have heretofore not received wide utilization on fork lift trucks because of the problems of space and lubrication. A lift truck has a very small, central hub area which greatly limits the size, the type of brake and the means for actuating the brake. Lubrication for wet disc brakes is a problem if direct lubrication is required from the differential. An open tube is necessary and direct fluid access must be provided between the differential and the brakes. If separate lubrication is required, then the differential and the jack shafts must be sealed.

Further problems with disc brakes include providing mechanical actuation when the brakes are used for parking and hydraulic actuation when the brakes are used as service brakes. In addition, the disc brakes and the actuating system must permit both easy removal of the differential and also support for the differential during operation.

Prior work in the field of mounting lift truck differentials includes U.S. Pat. No. 4,100,986 entitled "Split Pillow Block For Mounting A Differential" by W. Shipitalo, issued on July 18, 1978; and U.S. Pat. No. 4,100,988 entitled "Vehicle Including Differential Mounting" issued July 18, 1978 to H. Hildebrecht.

Prior designs for actuating lift truck disc brakes include U.S. Pat. No. 3,048,241 entitled "Disc Brake Actuating And Adjusting Mechanism" by O. K. Kelley et al., issued on Aug. 7, 1962; U.S. Pat. No. 3,638,763 entitled "Mechanical Actuating Mechanism For Disc Brake" by Bernard Laverdant, issued on Feb. 1, 1972; U.S. Pat. No. 3,674,118 entitled "Full Disc Brake With Rotating Brake Discs" by Hermann Klaue, issued on July 4, 1972, and U.S. Pat. No. 3,701,400 entitled "Parking Actuator For Disc Brake" by Richard T. Burnett et al., issued on Oct. 31, 1972.

The present invention is directed to overcoming one or more of the problems as set forth above.

DISCLOSURE OF THE INVENTION

In one aspect of the present invention a power train subassembly for a vehicle such as a fork lift truck having a frame, a support assembly rigidly affixed to the frame, a wheel assembly rotatably mounted on the support assembly, a differential having a jack shaft extending therefrom and a brake operatively associated with said wheel assembly and actuatable between an engaged and disengaged condition is contemplated. The improvement comprises means for mechanically actuating the brake between said engaged and disengaged condition and supporting said differential on said support assembly.

The problem of incorporating disc brakes into the limited space of the central hub area of a compact vehicle, such as a fork lift truck, has been met by the brake actuator disclosed herein. The actuator mechanically applies the brakes by an axial movement created from a rotational input about the jack shafts.

The difficulty of lubricating disc brakes in fork lift trucks is overcome either by utilizing each support tube as a conduit for lube oil from the differential or by sealing off the lube oil from the differential with a dynamic seal. In the latter case the disc brakes are independently lubricated.

One feature of the present invention is that the support tubes which actuate the brakes also support the differential with respect to the frame of the lift truck.

A further feature of the present invention is that the differential can be easily removed from the drive line of a fork lift truck after first removing the support tubes and the jack shafts.

Other aspects, objects and advantages of this invention can be obtained from a study of the drawings, the disclosure and the appended claims.

BEST MODE FOR CARRYING OUT THE INVENTION

Figure 1:
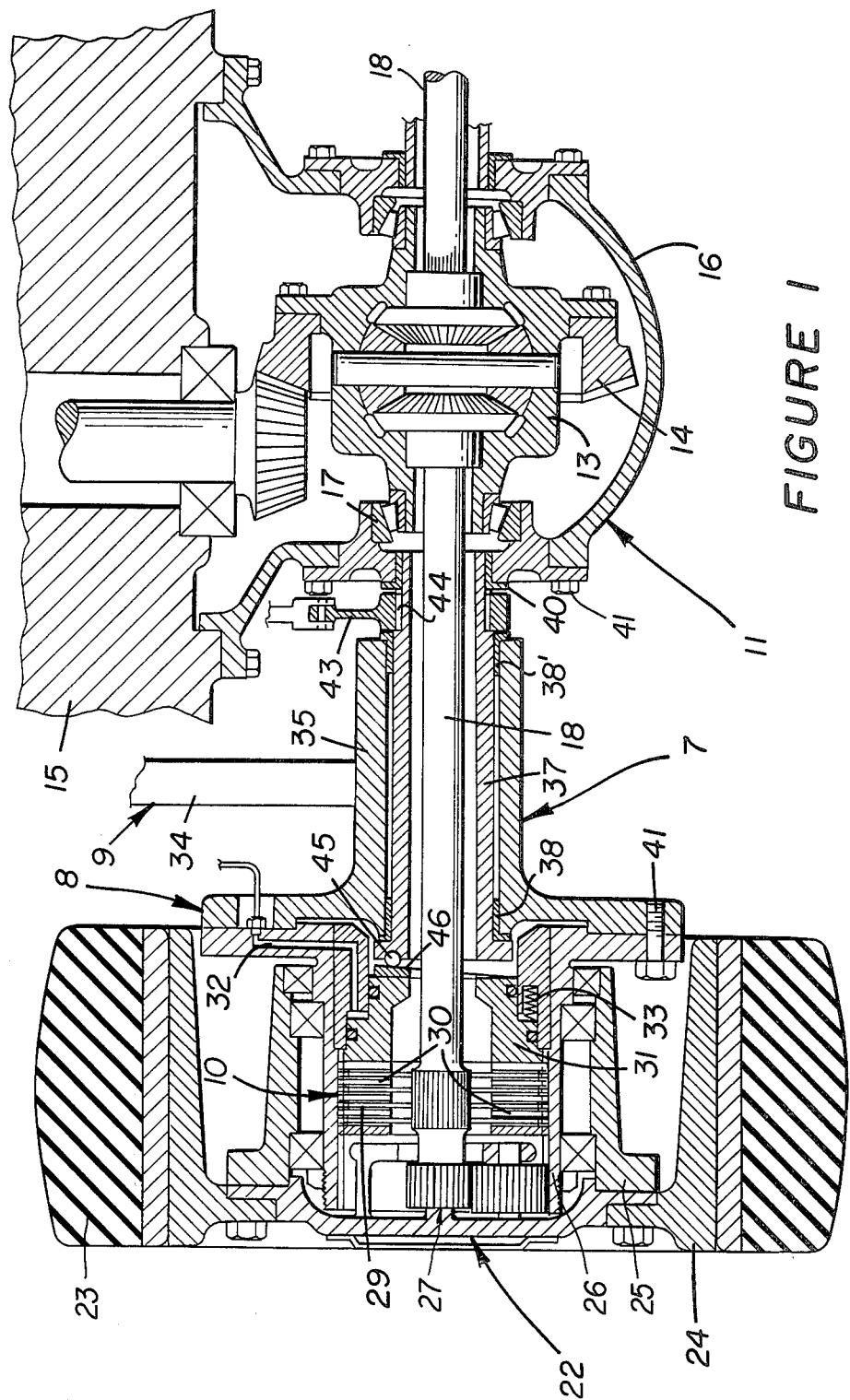
FIG. 1 is a top plan view, partially in cross section and partially broken-away, of one embodiment of the present invention.

FIG. 1 illustrates a power train subassembly 8 mounted on a frame 9 of a vehicle, such as a fork lift truck. This invention is directed to means 7 for actuating disc brakes 10 of the subassembly 8 and for supporting a differential 11. Although this invention is particularly applicable to disc brakes, it will be appreciated by those skilled in the braking arts that it is applicable to other types of axially and transversely engaging braking systems, such as shoe brakes.

As illustrated in FIG. 1 the differential 11 and a transmission 15 are combined together in one unitary transaxle assembly. The U-joint in the drive train is located between the engine (not shown) and the transmission 15. The engine drives the differential which rotates two jack shafts 18 in the conventional manner. The jack shafts are co-axial and of conventional construction. The jack shafts 18 and the differential gears are mounted on bearings 17 for rotation with respect to a differential housing 16. The differential housing 16 and the transmission 15 are supported by the brake actuator apparatus or means 7 as described in detail below.

Still referring to FIG. 1, each jack shaft 18 rotates a wheel drive assembly 22 of conventional construction consisting of a tire 23, a rim 24, a hub 25, and a spindle 26 that carries a planetary reduction gear assembly 27. The disc brakes 10 include a plurality of discs 29 that are splined to the jack shaft 18 and a plurality of brake reaction members 30, splined internally to the spindle 26. Brake 10 is actuated by axial movement of a brake piston 31 from right to left as illustrated in FIG. 1. For service braking the piston 31 is hydraulically actuated by pressure in the hydraulic line 32. When the brakes are used as parking brakes, the brake piston 31 is mechanically actuated as described in detail below. A positioning spring 33 locates the piston 31 adjacent to the brake so that the piston does not drift to the right when the brake is not actuated.

Each end of the power train subassembly 8, FIG. 1, is supported from a frame member 34 of the fork lift truck by an inboard flange 35. This flange is stationary and is rigidly connected to the frame. Each flange supports a hollow support tube 37 with two co-axial sleeve bearings 38 and 38' that permit rotation of the tube relative to the frame 34. The support tube surrounds and is concentric to the jack shaft 18. The support tube 37 supports the differential housing 16 and the transmission 15 across a radial flanged thrust and sleeve bearing 40. This bearing permits relative rotation of the support tube wth respect to the differential housing 16.

It should be appreciated that the power train subassembly 8, FIG. 1, is constructed so that the jack shafts 18 are not statically loaded by the weight of the power train subassembly. The jack shafts are subjected only to the torque which drives and stops the wheels. The inboard flange 35 bears the weight of the wheel 24 across a circumferential bolt circle, including a bolt 41, and the weight of the differential 11 and transmission 15 is supported through the support tube 37.

The support tube 37, FIG. 1, besides supporting the differential 11 with respect to the lift truck 9, also mechanically actuates the disc brakes 10. An actuator arm 43 engages a spline 44 on the end of the support tube 37 near the differential housing 16. The free end of the actuator arm is connected by a linkage (not shown) connected to the operator's parking brake lever. Actuation of the parking brake lever causes motion of the actuator arm 43 through the connecting linkage (not shown) and in turn causes rotation of the support tube 37 with respect to both the inboard flange 35 and the differential housing 16. This rotational motion is permitted by the bearing 38,38' and 40.

Captured in the outboard end of each support tube 37 are a plurality of balls 45. Each ball rolls in place and engages the face of a helical inclined ramp 46. There is an inclined ramp associated with each ball and attached to the inboard face of the brake piston 31. The engagement of the balls and ramps converts the rotation of the support tube 37 into axial motion of the brake piston 31.

Each disc brake 10, FIG. 1, is lubricated using oil from the differential 11. Lubrication is essential for the brakes in order to reduce wear and to dissipate the heat developed during braking. The support tube 37 forms a conduit between the differential and the brakes 10 so that lubricating oil can freely flow back and forth. The support tube 37 is a hollow tube open at each end that surrounds each jack shaft 18 and is concentric therewith.

Figure 2:
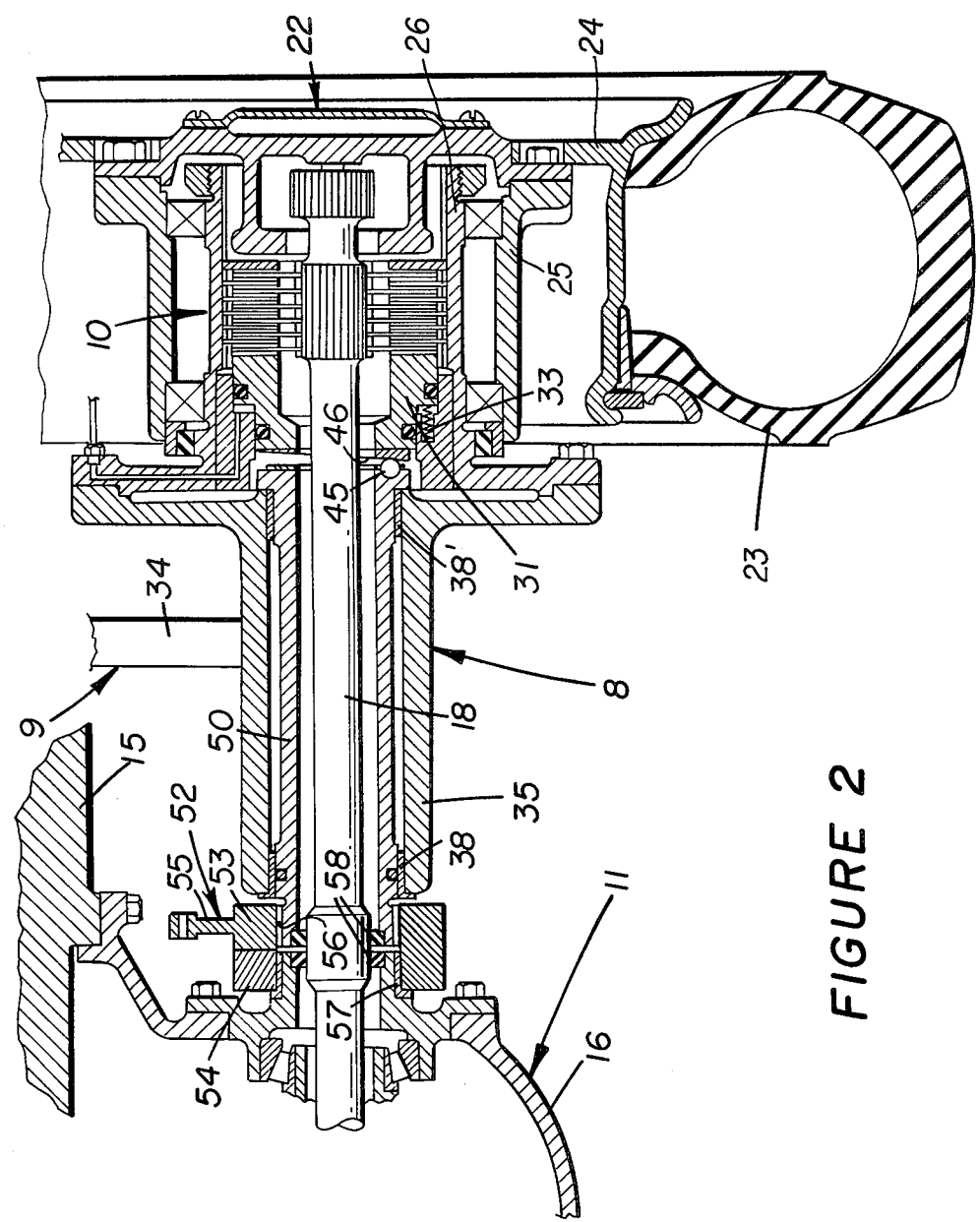
FIG. 2 is a top plan view, partially in cross section and partially broken-away, of a second embodiment of the present invention.
Figure 3:
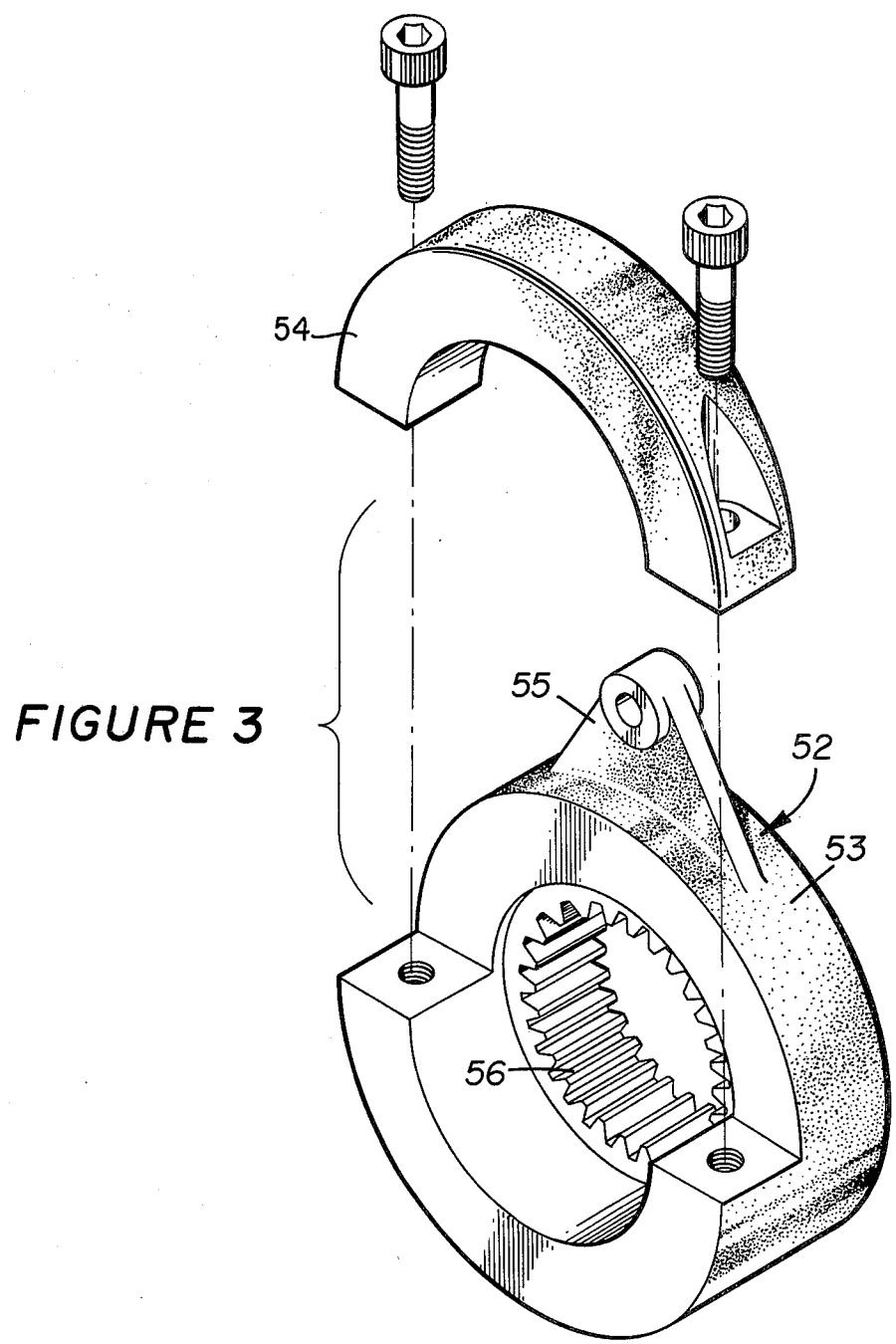
FIG. 3 is a perspective view of a coupling utilized in the embodiment of FIG. 2.

FIGS. 2 and 3 illustrate an alternative embodiment of the present invention which isolates the lubricant in the differential from the lubricant in the brakes and which also facilitates assembly of the components of the power train subassembly 8.

The construction and operation of the differential 11 and the disc brakes 10 are the same as described above. The frame member 34 of the lift truck frame 9 rigidly supports the inboard flange 35 and the inboard flange supports a hollow support tube 50 with the two bearings 38 that permit relative axial rotation of the support tube with respect to the frame 34. The support tube 50 mechanically actuates the disc brakes 10 with the captured balls 45 and helical ramps 46 as described above.

A coupling 52 is splined to the end of the support tube 50 nearest the differential 11. Referring to FIG. 3, the coupling includes a continuous ring portion 53 which engages the spline 56 on the inboard end of the support tube 50. The engagement of the continuous ring portion and the spline insures that motion of the coupling 52 around the jack shaft 18 translates directly into rotation of the support tube 50 for mechanical brake actuation. The coupling is turned by a parking brake linkage (not shown) that engages an arm 55 on the coupling. The coupling also includes a pillow block portion 54 that supports the differential housing 16 across the bearing 57. The purpose of the pillow block portion of the coupling is to support the differential 11 with respect to the frame member 34 via the inboard flange 35 and the support tube 50. The pillow block portion also permits relative rotation of the support tube 50 and the coupling 52 with respect to the stationary differential housing 16.

Two dynamic seals 58 are mounted on the abutting ends of the differential housing 16 and the support tube 50. These seals are lip-type seals and serve to isolate the differential lubricant from the lubricant in the brakes. It is believed that such isolation may be necessary if the brake lubricating system is subject to contamination from abrasive materials.

Like the embodiment of FIG. 1 each jack shaft 18, FIG. 2, does not carry any of the weight of the differential 11 or the wheel drive assembly 22. The jack shafts experience only the torque forces of accelerating the lift truck. Thus, the dynamic seals 58 are not subject to any static forces.

INDUSTRIAL APPLICABILITY

The embodiments disclosed herein have braking applications to vehicles, particularly fork lift trucks that utilize disc brakes.

To assemble the embodiment of FIG. 1, the inboard flange 35 is mounted to the frame 34 and the differential housing 16 is placed in position. Then, the support tube 37 is inserted through the flange 35 and into position in the sidewall of the differential housing 16. The support tube provides support for the differential and the transmission 15. Thereafter the differential housing 16 is inserted inside of the support tube 37 and the wheel drive assembly 22 and brakes 10 are installed.

To assemble the embodiment illustrated in FIG. 2, the wheel drive assembly 22 and brakes 10 are first assembled and attached to the jack shaft 18 and the inboard flange 35 is mounted on the frame 34. Next, the support tube 50 is inserted into the inboard flange 35 and the coupling 52 is mounted on the spline of the support tube. Thereafter, the differential housing 16 is positioned in the pillow block portion 54 of the coupling and the removable portion of the pillow block is bolted in place to secure the differential 11 and the transmission 15 in place. Thereafter, the jack shaft 18 is inserted into the differential 11 and the remainder of the components are installed on the power train subassembly 8.

Both embodiments operate in the same manner to mechanically actuate the disc brakes 10. The operator has access to a lever which moves a linkage (not shown) that connects to either the actuator arm 43, FIG. 1, or the arm 55, FIG. 2, on the coupling 52. Motion of these arms causes axial rotation of the support tubes 37, FIG. 1, and 50, FIG. 2, which in turn causes the ball 45 to engage the helical ramp 46 and to push the brake piston 31 laterally into engagement with the discs 29.

The disc brakes 10 are released by rotating the support tubes 37, FIG. 1, and 50, FIG. 2, in the opposite direction from actuation. The ball 45 disengages from the helical ramp 46 thereby permitting the brake piston 31 to release the discs 29 and the wheel drive assembly to turn.

Thus, from the foregoing it can be seen how lubricated disc brakes can be incorporated into the small central hub area of a fork lift truck power train. The problems of mechanically actuating the brakes for parking, supporting the differential during operation, and permitting easy removal of the differential are met by the parking brake actuator disclosed herein.

Other aspects, objects and advantages of this invention can be obtained from a study of the drawings, the disclosure and the appended claims.

We claim:

1. In a power train subassembly (8) for a vehicle having a frame (9), a support assembly (35) rigidly affixed to the frame (9), a wheel drive assembly (22) rotatably mounted on the support assembly (35), a differential (11) having a jack shaft (18) extending therefrom and a brake (10) operatively associated with said wheel assembly (22) and actuatable between an engaged and disengaged condition, comprising:

a support tube (37,50) connecting said differential (11) to said support assembly (35), said support tube (37,50) being axially rotatable relative to said jack shaft (18); and means (45,46) for converting axial rotation of said support tube (37,50) into lateral motion and mechanically actuating the brake (10) between said engaged and disengaged condition, said means for converting (45,46) being connected to said support tube (37,50).

2. An apparatus as in claim 1 wherein said rotation converting means (45,46) includes a ball bearing (45) mounted on an end of the axially rotatable support tube (37,50) and a laterally movable inclined member (46) engaged by the ball bearing (45) and operatively connected to the brake (10).

3. A power train subassembly (8) for a vehicle, comprising:
   (a) a frame (9);
   (b) an elongate hollow support tube (37) supported by the frame (9) for axial rotation with respect thereto;
   (c) an elongate jack shaft (18) disposed within the support tube (37);
   (d) a differential (11) supported by the support tube (37) and connected to rotate the jack shaft (18) and a wheel drive assembly (22);
   (e) a disc brake (10) mounted on the jack shaft (18), said brake (10) being in fluid communication with the differential (11) through said hollow support tube (37) and lubricated thereby, said brake (10) being mechanically actuated by axial rotation of the support tube (37) relative to the frame (9).

4. An apparatus as in claim 3 including a ball bearing (45) mounted on an end of the axially rotatable support tube (37) and a laterally movable inclined member (46) engaged by the ball bearing (45) and operatively connected to the brake (10).

5. An apparatus as in claim 3 including a spline (44) on an end of the axially rotatable support tube (37) and a brake actuating arm (43) engaging said spline (44) and perpendicular to the support tube (37).

6. A power train subassembly (8) for a vehicle, comprising:
   (a) a frame (9);
   (b) an elongate hollow support tube (50) supported by the frame (9) for axial rotation with respect thereto;
   (c) an elongate jack shaft (18) disposed within the support tube (50);
   (d) a differential (11) supported by the support tube (50) and connected to rotate the drive shaft (18) and a wheel drive assembly (22);
   (e) a disc brake (10) mounted on the jack shaft (18) and the lubricated independently from the differential (11), said brake (10) being mechanically actuated by axial rotation of the support tube (50) relative to the frame (9); and
   (f) a pillow block (52) supporting the differential (11) relative to the support tube (50) and having a brake actuating arm (55) thereon perpendicular to the support tube (50), said support tube (50) having a spline (56) on an end and engaged by the pillow block (52) for axial rotation of the support tube (50) relative to the frame (9).

7. An apparatus as in claim 6 including lubrication for the power train subassembly (8) and means (58), located within the hollow support tube (50) between said differential (11) and said wheel drive assembly (22), for isolating the lubrication in the differential (11) from the lubrication in the disc brake (10).

* * * * *